United States Patent
Shioji et al.

(10) Patent No.: US 7,450,162 B2
(45) Date of Patent: Nov. 11, 2008

(54) DIGITAL CAMERA CREATING MOVING IMAGE FILES FROM A PLURALITY OF CAPTURED STILL IMAGES

(75) Inventors: Masahiro Shioji, Osaka (JP); Junya Kaku, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 455 days.

(21) Appl. No.: 10/257,577

(22) PCT Filed: Apr. 9, 2001

(86) PCT No.: PCT/JP01/03059

§ 371 (c)(1),
(2), (4) Date: Oct. 11, 2002

(87) PCT Pub. No.: WO01/80556

PCT Pub. Date: Oct. 25, 2001

(65) Prior Publication Data

US 2003/0107657 A1 Jun. 12, 2003

(30) Foreign Application Priority Data

Apr. 13, 2000 (JP) .............................. 2000-112327

(51) Int. Cl.
*H04N 9/73* (2006.01)
*H04N 9/64* (2006.01)
*H04N 5/00* (2006.01)
*G03B 3/10* (2006.01)
*G03B 13/34* (2006.01)
*G03B 7/00* (2006.01)

(52) U.S. Cl. .................. 348/231.2; 348/715; 386/121; 396/130; 396/224

(58) Field of Classification Search .............. 348/231.2, 348/231.3, 231.5, 231.6, 231.99, 451, 452, 348/715; 386/117, 120, 121; 396/130, 146, 396/212, 224
See application file for complete search history.

(56) References Cited

U.S. PATENT DOCUMENTS 5,699,115 A * 12/1997 Hiraki et al. ........... 348/333.13

(Continued)

FOREIGN PATENT DOCUMENTS

JP         63-195639        12/1988

(Continued)

*Primary Examiner*—John M. Villecco
*Assistant Examiner*—Daniel M. Pasiewicz
(74) *Attorney, Agent, or Firm*—Gerald T. Bodner

(57) ABSTRACT

A digital camera 10 includes a CCD imager 14. When an interval photographing or an animation photographing is selected, an object is photographed by the CCD imager 14 for a plurality of times, and compressed image data is generated each photographing by each photographing. The generated compressed image data is stored in a temporary area of an magnetooptical disk 42. Upon completion of photographing the desired number of frames, the generated respective compressed image data are converted into a moving image file, and moved to a proper recording area of the magnetooptical disk 42. Frame rate information is written in the moving image file. Upon reproducing, firstly, the frame rate information is detected, the compressed image data of each frame is reproduced in accordance with this information. The moving image that moves at a desired speed is displayed on a monitor 30.

7 Claims, 11 Drawing Sheets

U.S. PATENT DOCUMENTS

| | | | |
|---|---|---|---|
| 6,002,436 A * | 12/1999 | Anderson | 348/372 |
| 6,118,480 A * | 9/2000 | Anderson et al. | 348/207.99 |
| 6,714,249 B2 * | 3/2004 | May et al. | 348/373 |
| 6,738,075 B1 * | 5/2004 | Torres et al. | 715/723 |
| 6,774,940 B1 * | 8/2004 | Ogura et al. | 348/231.99 |
| 7,012,638 B1 * | 3/2006 | Yokonuma | 348/220.1 |
| 7,027,086 B1 * | 4/2006 | Ozawa et al. | 348/220.1 |

FOREIGN PATENT DOCUMENTS

| | | |
|---|---|---|
| JP | 02-013077 | 1/1990 |
| JP | 03-207171 | 10/1991 |
| JP | 10-145717 | 5/1998 |
| JP | 10-191110 | 7/1998 |
| JP | 11-261952 | 9/1999 |
| JP | 11-298784 | 10/1999 |
| JP | 11-008795 | 12/1999 |
| JP | 11-341421 | 12/1999 |
| JP | 2000-041207 | 2/2000 |
| JP | 2000-078506 | 3/2000 |
| JP | 2000-082127 | 3/2000 |
| JP | 2000-092437 | 3/2000 |

* cited by examiner

DIGITAL CAMERA CREATING MOVING IMAGE FILES FROM A PLURALITY OF CAPTURED STILL IMAGES

TECHNICAL FIELD

The present invention relates to a digital camera. More specifically, the present invention relates to a digital camera that records a moving image signal of an object, for example.

PRIOR ART

As for such a kind of a conventional digital camera, there was a digital camera that photographs a moving image of an object at a frame rate of approximately 15 fps when a shutter button is operated, and records a photographed moving image signal into a recording medium. The moving image signal is reproduced from the recording medium at the same frame rate as at a time of recording when reproducing, thereby showing on a display an object image that moves at a normal speed.

However, in the prior art, although it is possible to record/reproduce at a normal speed, it was impossible to reproduce a plurality of still image signals in which a change that last for a long period of time, such as a blossom of plants, a cell division, and so on, for example is photographed as the moving image signal. Furthermore, it was also impossible to reproduce as the moving image signal a plurality of still image signals in which a clay modeling to be deformed is photographed.

SUMMARY OF THE INVENTION

Therefore, it is a primary object of the present invention to provide a digital camera capable of reproducing an image obtained as a result of a special photographing as a moving image.

According to the invention, a digital camera driven by a battery, comprises: a photographing means that generates a plurality of still image signals by photographing an object for a plurality of times; a storing means that stores, at each time that one still image signal is generated by the photographing means, the still image signal into a non-volatile memory area, and a recording means that records into a recording medium a moving image file including the plurality of still image signals stored in the memory area after the plurality of times of photographings by the photographing means.

The photographing means photographs an object for a plurality of times so as to generate a plurality of still images. Respective still images are stored in a volatile or non-volatile memory area by the storing means at each time that the photographing is performed. The recording means records into the recording medium a moving image file including the plurality of still image signals stored in the memory area after a plurality of times of photographings.

Since the plurality of still image signals to be photographed are recorded as a moving image file, a moving image on the basis of the respective still image signals are displayed when reproducing them. In addition, in a case that the respective still image signals are stored in the non-volatile memory area, the still image signal is not to be ceased even if a battery runs out in the middle of the photographing.

In a case that the recording medium is detachable, and the non-volatile memory area is formed within the recording medium, the photographed still image signal does not come under a defective influence even if a defect or problem occurs to the digital camera in the middle of the photographing.

In a case of displaying a real-time moving image of the object by a displaying means, preferably, a first receiving means receives an on/off instruction of the displaying means in a meantime of the photographing. The displaying means is turned on/off by an on/off means in response to the received on/off instruction. As a result of a display of the real-time moving image arbitrarily being turned on/off, electric power consumption of the battery is restrained.

If a photographing condition is locked prior to the photographing by the photographing means, a brightness and a coloring of the object are not drastically changed even if elements constituting a screen changes.

Preferably, the recording means adds to the moving image file period information showing a period that reproduces each of the plurality of still images. Each of the still image signals is reproduced by the period according to the period information.

In a case that the photographing means performs a photographing at a predetermined period, a period shown by the period information is preferably shorter than the predetermined period, thereby making it possible to perform a low-speed photographing.

In a case that a photographing instruction from an operator is received by a second receiving means, and the photographing means preferably performs a photographing at each time that the photographing instruction is received, thereby making it possible to photograph at arbitrary time intervals.

The above described objects and other objects, features, aspects and advantages of the present invention will become more apparent from the following detailed description of the present invention when taken in conjunction with the accompanying drawings.

BEST MODE FOR PRACTICING THE INVENTION

Figure 1:
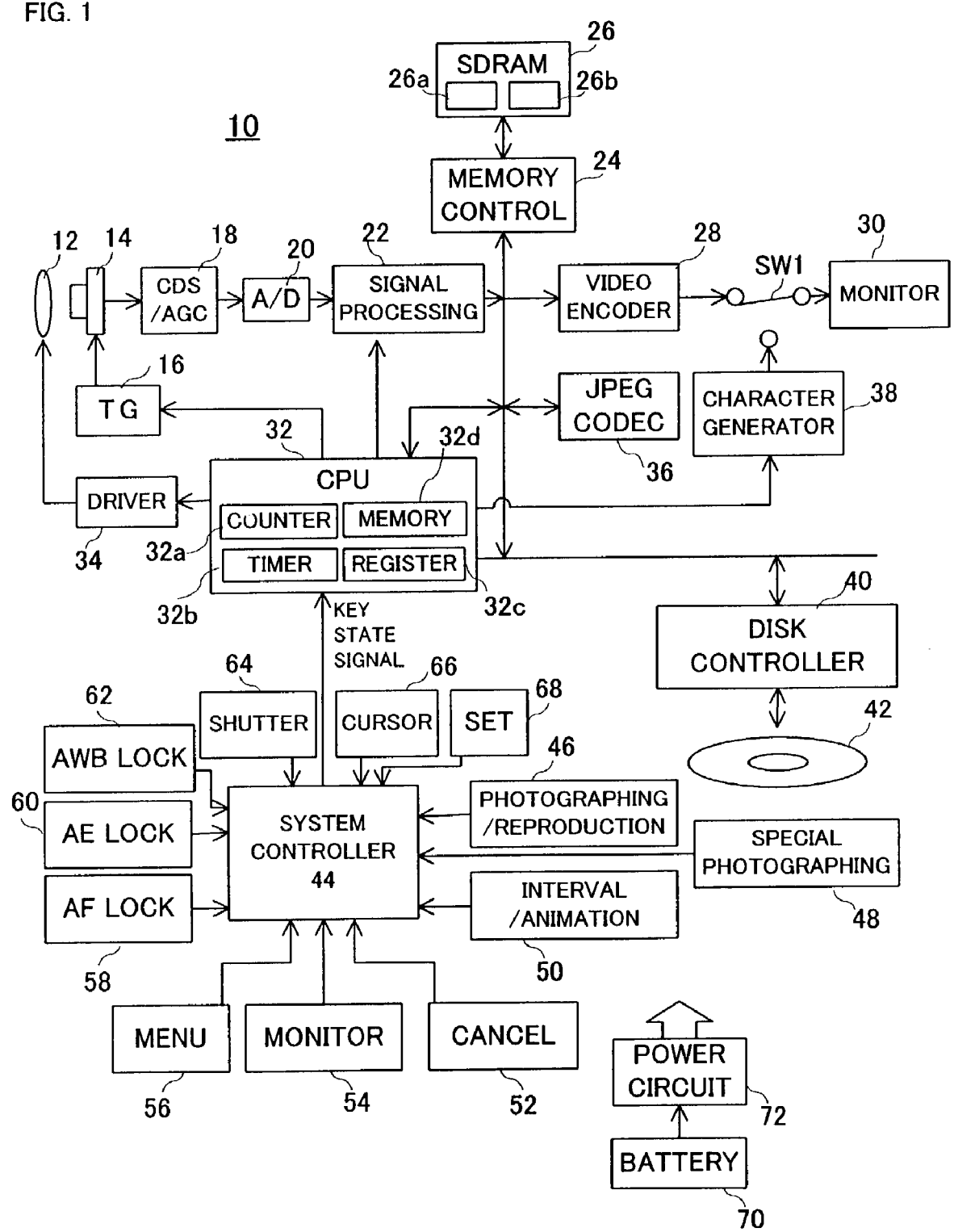
FIG. 1 is a block diagram showing one embodiment of the present invention.
Figure 2:
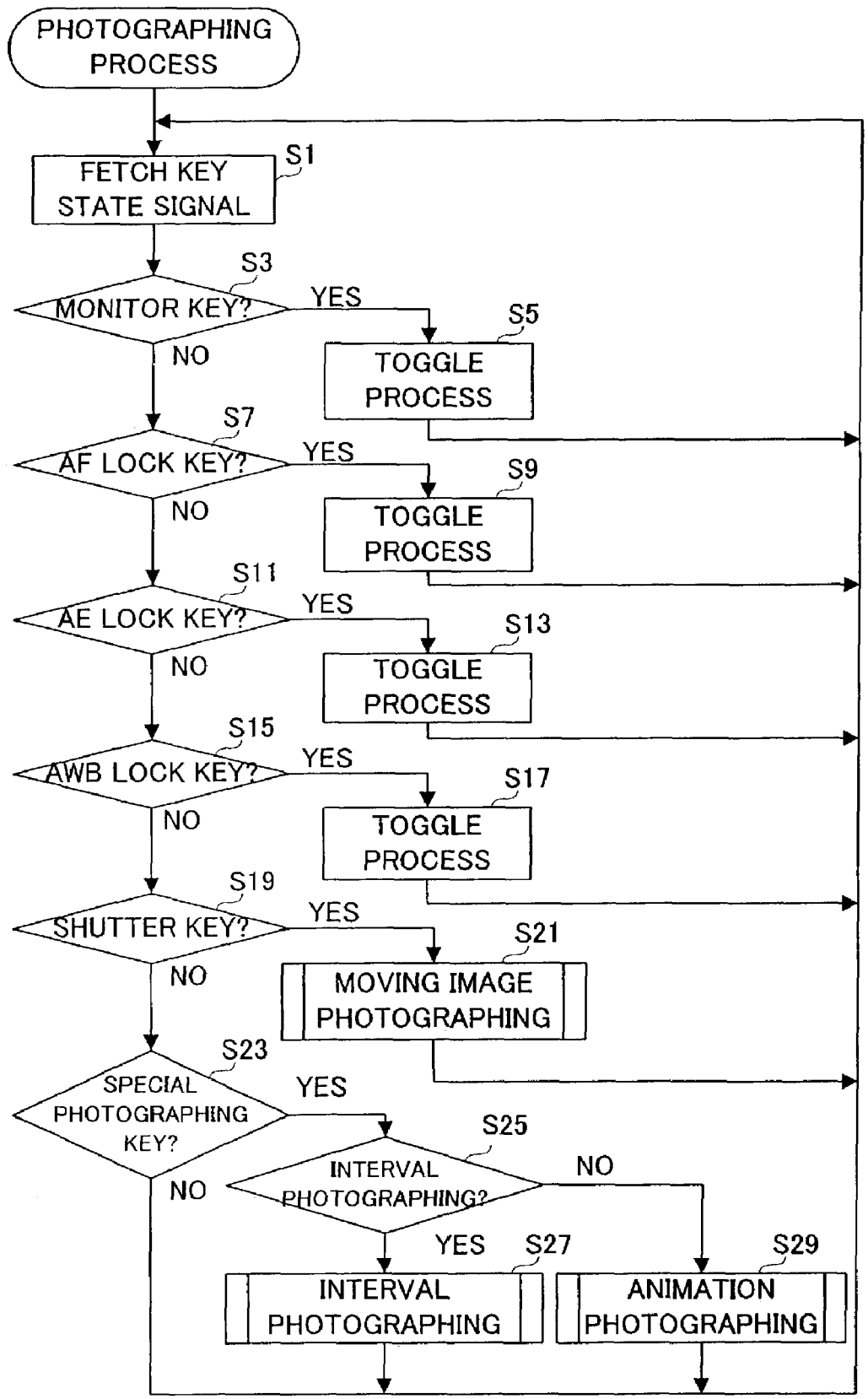
FIG. 2 is a flowchart showing one portion of a photographing process.

Referring to FIG. 1, a digital camera 10 in this embodiment includes a focus lens 12. An optical image of an object is incident on a light-receiving surface of a CCD imager 14 via the focus lens 12. A camera signal (raw image signal) corresponding to the incident optical image is generated by an photoelectronic conversion on the light-receiving surface.

A timing generator (TG) 16 reads out the camera signal from the CCD imager 14 at a frame rate of 15 fps when a process instruction is applied from a CPU 32. The read camera signal is converted into a digital signal by an A/D converter 20 via a well-known noise removal and a level adjustment in a CDS/AGC circuit 18.

A signal process circuit 22 subjects camera data outputted from the A/D converter 20 to well-known signal processes such as a color separation, an RGB conversion, a white balance adjustment, a YUV conversion, and etc so as to generate image data formed of a luminance component (Y data) and chrominance components (U data, V data) when the process instruction is applied from the CPU 32. Generated image data is applied to a memory control circuit 24, and written into an image data storing area 26a of an SDRAM 26 by the memory control circuit 24.

A video encoder 28 causes the memory control circuit 24 to read out the image data within the image data storing area 26a in response to the process instruction from the CPU 32. The read image data is encoded into a composite image signal in an NTSC format, and an encoded composite image signal is supplied to an LCD 30 through a switch SW1. As a result, an image corresponding to the composite image signal is displayed on the screen.

A character generator 38 produces a character signal showing a menu when a menu displaying instruction is applied from the CPU 32. The character signal is applied to the LCD 30 via the switch SW1, thereby OSD-displaying the menu on the screen.

A JPEG CODEC 36 causes the memory control circuit 24 to read out one frame of the image data stored in the image data storing area 26a in receipt of a compression instruction from the CPU 32, and subjects the read image data to a compression process in accordance with a JPEG format. When compressed image data is obtained, the JPEG CODEC 36 applies generated compressed image data to the memory control circuit 24. The compressed image data is stored in the compressed data storing area 26b by the memory control circuit 24. On the other hand, in receipt of a decompression instruction from the CPU 32, the JPEG CODEC 36 causes the memory control circuit 24 to read out one frame of the compressed image data stored in the compressed data storing area 26b, and subjects the read compressed image data to a decompression process in accordance with the JPEG format. In obtaining decompressed image data, the JPEG CODEC 36 stores the decompressed image data in the image data storing area 26a through the memory control circuit 24.

In addition to producing the aforementioned process instructions, the CPU 32 adjusts an exposing time, a focus, and a white balance on the basis of the camera data. The exposing time is adjusted by setting desired exposing time data to the TG 16, the focus is adjusted by controlling a driver 34 that drives a focus lens 12, and the white balance is adjusted by setting a desired adjusting value to the signal process circuit 22.

Furthermore, the CPU 32 performs a recording/reproducing the compressed image data by itself. The CPU 32, in recording, reads out the compressed image data stored in the compressed data storing area 26b through the memory control circuit 24, and applies to a disk controller 40 the read compressed image data along with a recording instruction. In converting the compressed image data into a file format, the CPU 32 prepares management information (header information) by itself, and applies to the disk controller 40 the prepared management information along with the recording instruction. The compressed image data and the management information prepared as required are recorded onto a magnetooptical disk 42 by the disk controller 40.

The CPU 32, in reproducing, applies a reproducing instruction to the disk controller 40, and writes the read compressed image data read from the magnetooptical disk 42 by the disk controller 40 into the compressed data storing area 26b through the memory control circuit 24. It is noted that the magnetooptical disk 42 is a detachable non-volatile recording medium, and becomes accessible by the disk controller 40 when being attached to a slot (not shown).

Various operation keys 46-66 are connected to a system controller 44, and a key state signal showing a key state as of that time is applied from the system controller 44 to the CPU 36 when a key operation is performed by an operator. Herein, a photographing/reproducing change key 46 is a key for selecting one of a photographing mode and a reproducing mode, a special photographing key 48 is a key that becomes valid in the photographing mode and selects a special photographing mode, and an interval/animation change key 50 is a key that become valid in the special photographing mode and selects one of the interval photographing mode and the animation photographing mode.

In addition, a cancel key 52 is a key for returning from the special photographing mode to a normal photographing mode, a monitor key 54 is a key for turning on/off the LCD 28, and a menu key 56 is a key for OSD-displaying the menu on the LCD 28. Furthermore, an AF lock key 58 is a key for locking a location (focus) of the focus lens 12, an AE lock key 60 is a key for locking the exposing time, and an AWB lock key 62 is a key for locking an adjusting value of the white balance. In addition, a shutter key 64 is a key for producing a photographing trigger of the object, a cursor key 66 is a key for moving a cursor on the menu when the menu is displayed. Moreover, a set key 68 is a key that instructs to end the recording in the animation photographing mode, instructs to start reproducing the moving image in the reproducing mode, and confirms an item at which the cursor points when the menu is displayed.

It is noted that the digital camera 10 in this embodiment uses a battery 70 as a main power source, and a power of the battery 70 is supplied to an entire system via a power source circuit 72 when a power source switch not shown is operated.

The CPU 32 processes flowcharts shown in FIG. 2-FIG. 7 when the photographing mode is selected. Firstly, the key state signal is fetched from the system controller 44 in a step S1, and it is determined which keys are operated in respective steps S3, S7, S11, S15, 519, 523, and 525.

In a case that the monitor key 54 is operated, YES is determined in the step S3, and a toggle process is carried out in a step S5. That is, if the monitor key 54 is operated when the LCD 30 is in an off state, a camera process is started together with lighting a fluorescence tube of the LCD 30 so as to display a real-time moving image (through image) of the object on the screen. The camera process is started by activating a photographing system including the CCD imager 14, the signal process circuit 22, and so on and a displaying system including the video encoder 28, and so on, and applying a process instruction to the TG 16, the signal process circuit 22, and the video encoder 28. On the other hand, if the monitor key 54 is operated when the LCD 30 is in an on state, the process extinguishes the fluorescence tube of the LCD 30, and also suspends the camera process. Upon completion of such the toggle process, the process return to the step S1.

When the AF lock key 58 is operated, YES is determined in the step S7, and the toggle process is carried out in a step S9. That is, when the AF lock key 58 is operated in a state that the focus lens 12 is not locked, the focus lens 12 is locked, and when the AF lock key 58 is operated in a state that the focus lens 12 is in a locked state, the locked state is canceled. Upon completion of the toggle process, the process returns to the step S1.

When the AE lock key 60 is operated, the process proceeds from the step S11 to a step S13 so as to carry out the toggle process in this step. That is, if the AE lock key 60 is depressed when the exposing time is locked, the locked state is canceled, and if the AE lock key 60 is depressed when the exposing time is not locked, the exposing time is locked. Upon completion of the toggle process, the process returns to the step S1.

If the AWB lock key 62 is operated, YES is determined in a step S15, and the toggle process is carried out in a step S17. That is, if the AWB lock key 62 is operated in a state that the adjusting value of the white balance is locked, the locked stated is canceled, and if the AWB lock key 62 is operated in a state that the adjusting value is not locked, the adjusting value is locked. Upon completion of the toggle process, the process return to the step S1.

In a case that the through image is displayed on the screen with the LCD 30 being in the on state, the photographing condition of a non-locked state is adjusted at each exposing time if at least one of the focus, the exposing time, and the white balance adjusting value is in the non-locked state. That is, if the focus is not locked, a location of the focus lens 12 is adjusted on the basis of a high frequency component of the image data of each frame, if the exposing time is not locked, the location of the focus lens 12 is adjusted on the basis of a luminance component of the image data of each frame, and if the white balance adjusting value is not locked, the white balance is adjusted on the basis of the RGB data of each frame. On the other hand, if all of the focus, the exposing time, and the white balance adjusting value are locked, the photographing of the object and the signal processes are carried out in accordance with these locked photographing conditions.

When the shutter key 64 is depressed, the process proceeds from the step S19 to a step S21 so as to carry out a moving image photographing process. If the LCD 30 is in an on state, in addition to applying a compression instruction to the JPEG CODEC 36 every 1/15 seconds, the process carries out a recording process by itself. If the LCD 30 is in an off state, the process further lights the fluorescence tube of the LCD 30, and also starts the camera process, thereby causing the compressed image data of a plurality of frames accumulated in the compressed data storing area 26*b* of the SDRAM 26 to be recorded in the magnetooptical disk 42 one frame by one frame by the disk controller 40. When the shutter key 64 is operated once again, an output of the compression instruction is canceled. The CPU 32 further creates header information that manages the compressed image data of each frame by itself, and records the generated header information into the magnetooptical disk 42 through the disk controller 40. A moving image file as shown in FIG. 9 is formed on the magnetooptical disk 42.

Figure 9:
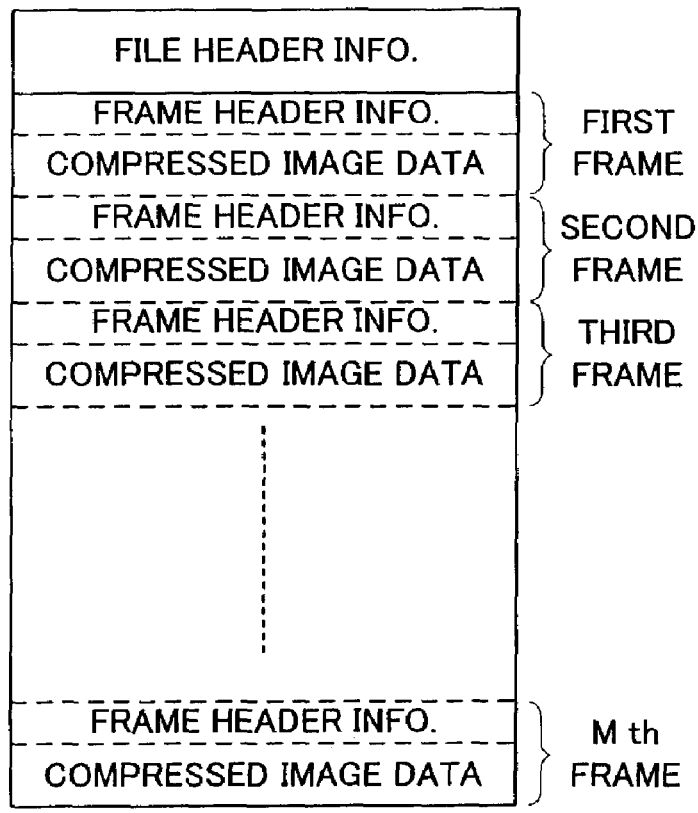
FIG. 9 is an illustrative view showing a moving image file.

According to FIG. 9, file header information is added to a forefront of the moving image file, and frame header information is added to a forefront of the compressed image data of each frame. Included in the file head information are information such as a file name of the moving image file, the total number of frames of the compressed image data within the moving image file, a forefront address of each frame, frame rate information of the moving image (15 fps), a total reproduction time, and so on. On the other hand, information such as a data compression format and so on are included in the frame header information.

When the special photographing key 48 is operated, the process proceeds from the step S23 to the step S25 so as to determine a state of the interval/animation key 50. Then, if "INTERVAL" is selected, an interval photographing process is carried out in a step S27, and if "ANIMATION" is selected, an animation photographing process is carried out in a step S29. Upon completion of the process of the step S27 or the step S29, the process returns to the step S1.

Figure 3:
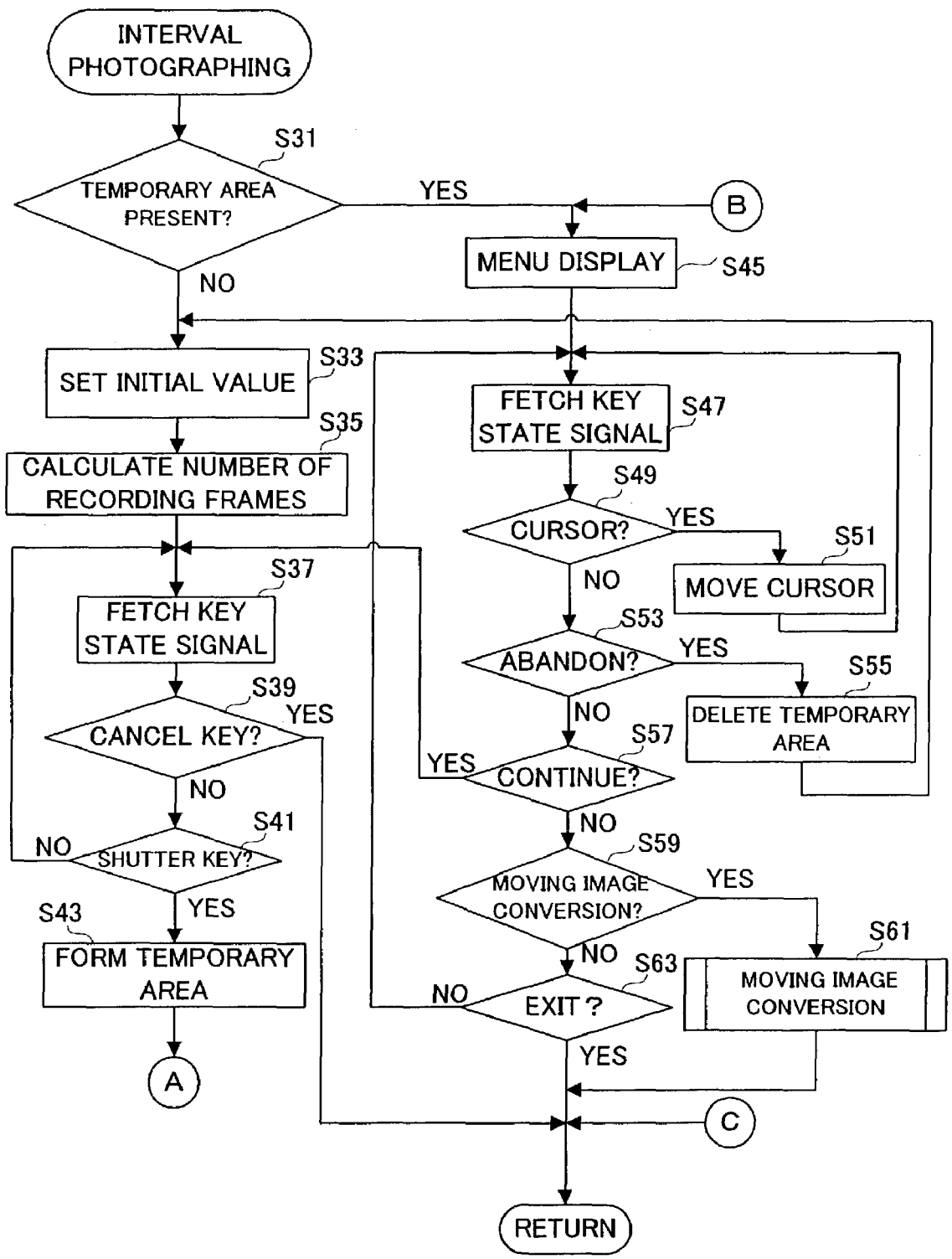
FIG. 3 is a flowchart showing one portion of an interval photographing process.
Figure 4:
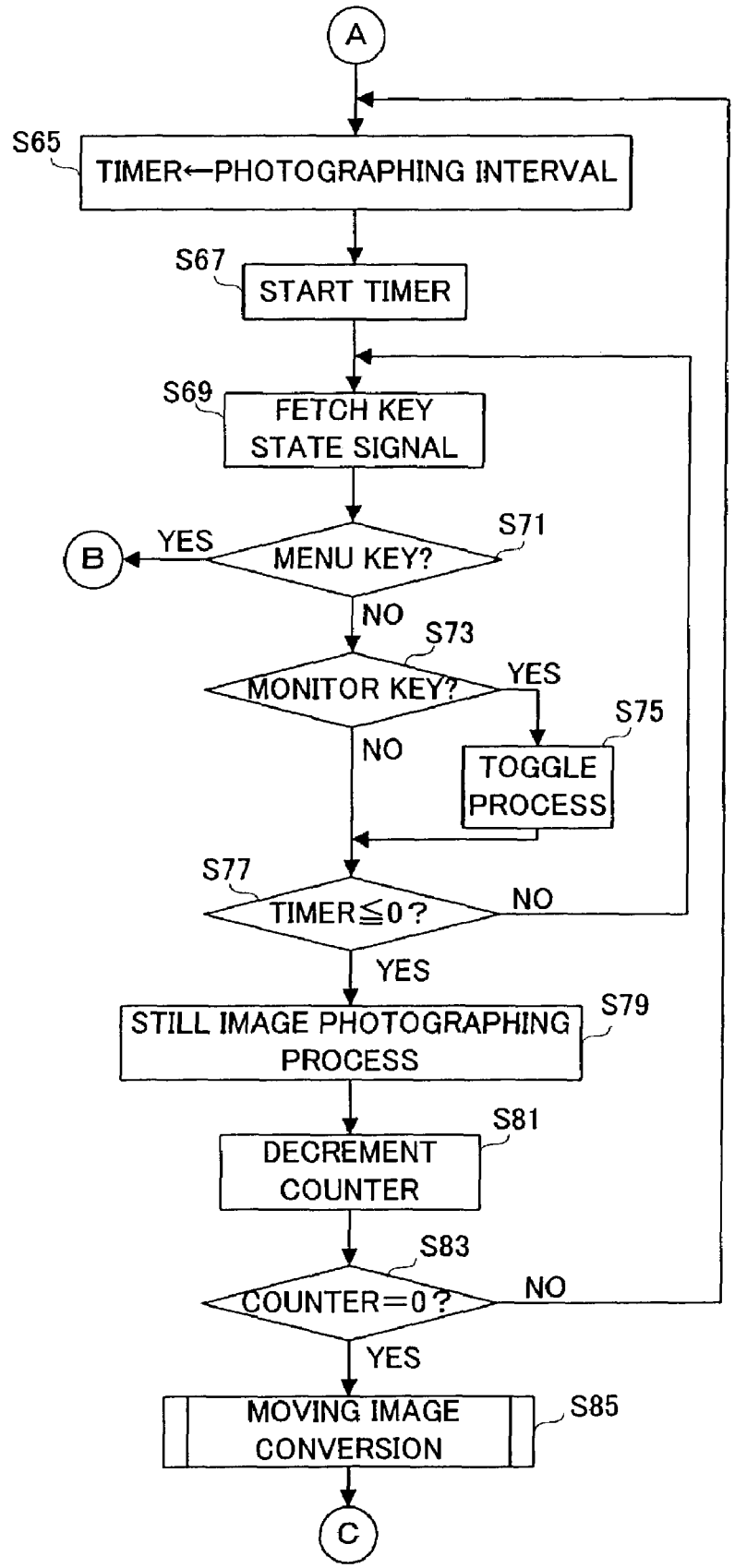
FIG. 4 is a flowchart showing another portion of the interval photographing process.

The interval photographing process is executed in accordance with a subroutine shown in FIG. 3 and FIG. 4. Firstly, it is determined whether or not a temporary area is formed within the magnetooptical disk 42 in a step S31, and if NO is determined, initial values of a photographing time interval (photographing period) and a moving image continuous time are set to a non-volatile register 32*c* in a step S33. The initial value of the photographing time interval is 60 seconds, for example, and the initial value of the moving image continuous time is 30 seconds, for example. The number of recording frames is calculated on the basis of the initial value of the moving image continuous time and a frame rate at a time of reproducing the moving image in a step S35. If the frame rate at a time of the reproduction is 15 fps, 450 frames of still images are needed in order to reproduce the moving image of 30 seconds. This allows the number of recording frames calculated in the step S35 to be "450". The calculated number of frames is set to the non-volatile counter 32*a*.

The key state signal is fetched from the system controller 44 in a step S37. Then, a content of the fetched key state signal is determined in a step S39 and a step S41. When the cancel key 52 is operated, the process returns to FIG. 2, determining YES in the step S39. On the other hand, when the shutter key 64 is depressed, YES is determined in the step S41, and a preparing instruction of the temporary area is applied to the disk controller 40 in a step S43. The temporary area is formed by the disk controller 40 within the magnetooptical disk 42. Next, the photographing time interval stored in the register 32*c* is set to a timer 32*b* in a step S65, and the timer 32*b* is started in a step S67. A value of the timer 32*b* is decremented every 1 second.

The key state signal is fetched in a step S69, and it is determined which key is operated in succeeding steps S71 and S73. When the menu key 56 is operated, the process returns to the step S45, determining YES in the step S71. On the other hand, the monitor key 54 is operated, the process proceeds from the step S73 to a step S75 so as to carry out the same trigger process as in the aforementioned step S5. Thus, a fluorescence tube of the LCD 30 is lit and the camera process is started if the monitor key 54 is depressed in a state that the LCD 30 is in an off state, thereby displaying the through image on the LCD 30. To the contrary, if the monitor key 54 is depressed when the through image is displayed on the LCD 30 (in the on state), the fluorescence tube of the LCD 30 is extinguished, and the camera process is suspended. Since the interval photographing is a time-consuming process, the battery 70 runs out before the photographing is completed if the on state of the LCD 30 continues. Thus, a switch on/off of the LCD 30 is to be changed after starting the photographing.

When neither the menu key 56 nor the monitor key 54 is operated, the process proceeds to a step S77 so as to determine whether or not the timer 32*b* shows a value equal to or less than "0". Then, although if NO is determined, the process returns to the step S69, if YES is determined, a still image photographing process of the object is carried out in a step S79.

If the LCD 30 is in the off state, and at least one of the focus, the exposing time, and the white balance is in the non-locked state, the camera process is firstly carried out so as to adjust the photographing condition of the non-locked state on the basis of a camera signal outputted from the CCD imager 14. Upon completion of adjusting the photographing condition, a primary exposing is carried out, and when the image data on the basis of the primary exposing is retained in the image data storing area 26a, the process applies a compression instruction to the JPEG CODEC 36. The image data retained in the image data storing area 26a is compressed by the JPEG CODEC 36, and compressed image data generated thereby is stored in the compressed data storing area 26b. The compressed image data is later recorded in the temporary area of the magnetooptical disk 42 by a recording process of the CPU 32 by itself.

It is noted that even if at least one of the photographing conditions is in the non-locked state, the photographing condition is already adjusted at a time of starting the still image photographing process in a case that the LCD 30 is in the on state. In this case, the primary exposing is immediately carried out, and the same process described above is carried out after the primary exposing. Even in a case that all of the focus, the exposing time, and the white balance adjusting value are locked, it is not needed to adjust the photographing condition. Thus, the primary exposing is immediately carried out with disregard to a fact that the LCD 30 is in the on state or in the off state, and the compressed image data is recorded in the temporary area by the same process described above.

Upon completion of such the still image photographing process, the value of the counter 32a is decremented in a step S81, and it is determined whether or not a count value shows "0" in a succeeding step S83. If the count value is equal to or more than "1", the process returns to the step S65 so as to repeat the same process as described above. To the contrary, if the count value is "0", the process proceeds to a step S85, assuming that the compressed image data of the number of frames calculated in the step S35 is obtained in the temporary area. A plurality of the compressed image data stored in the temporary area are converted into a moving image file format in a step S85, and upon completion of the conversion process, the process returns to FIG. 2.

Figure 10:
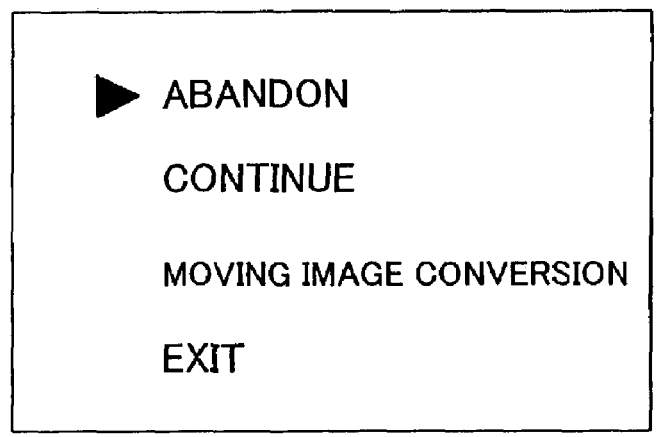
FIG. 10 is an illustrative view showing a menu screen.

If YES is determined in the step 531 or 571, a menu shown in FIG. 10 is OSD-displayed on the monitor 30 in a step S45. According to FIG. 10, four items such as "ABANDON", "CONTINUE", "MOVING IMAGE CONVERSION", and "EXIT", and a cursor pointing at any one of these items are displayed. In a succeeding step S47, the key state signal is fetched from the system controller 44, and it is determined which key is operated on the basis thereof. If the cursor key 66 is operated as determined in a step S49, the process moves the cursor in a step S51, and returns to the step S47 once again.

If the set key 68 is operated in a state that the cursor points at the "ABANDON", the process proceeds from a step S53 to a step S55 so as to apply a deleting instruction of the temporary area to the disk controller 40. The disk controller 40 deletes the temporary area in response to the deleting instruction, and the compressed image data within the temporary area is deleted along therewith.

If the set key 68 is operated while the cursor points at "CONTINUE", the process moves to the step S37, determining YES in a step S57. If the set key 68 is operated while the cursor points at "MOVING IMAGE CONVERSION", the process proceeds from a step S59 to a step S61 so as to convert the compressed image data within the temporary area into the moving image file. If the set key 68 is operated while the cursor points at "EXIT", the process returns to FIG. 2, determining YES in a step S63.

Figure 7:
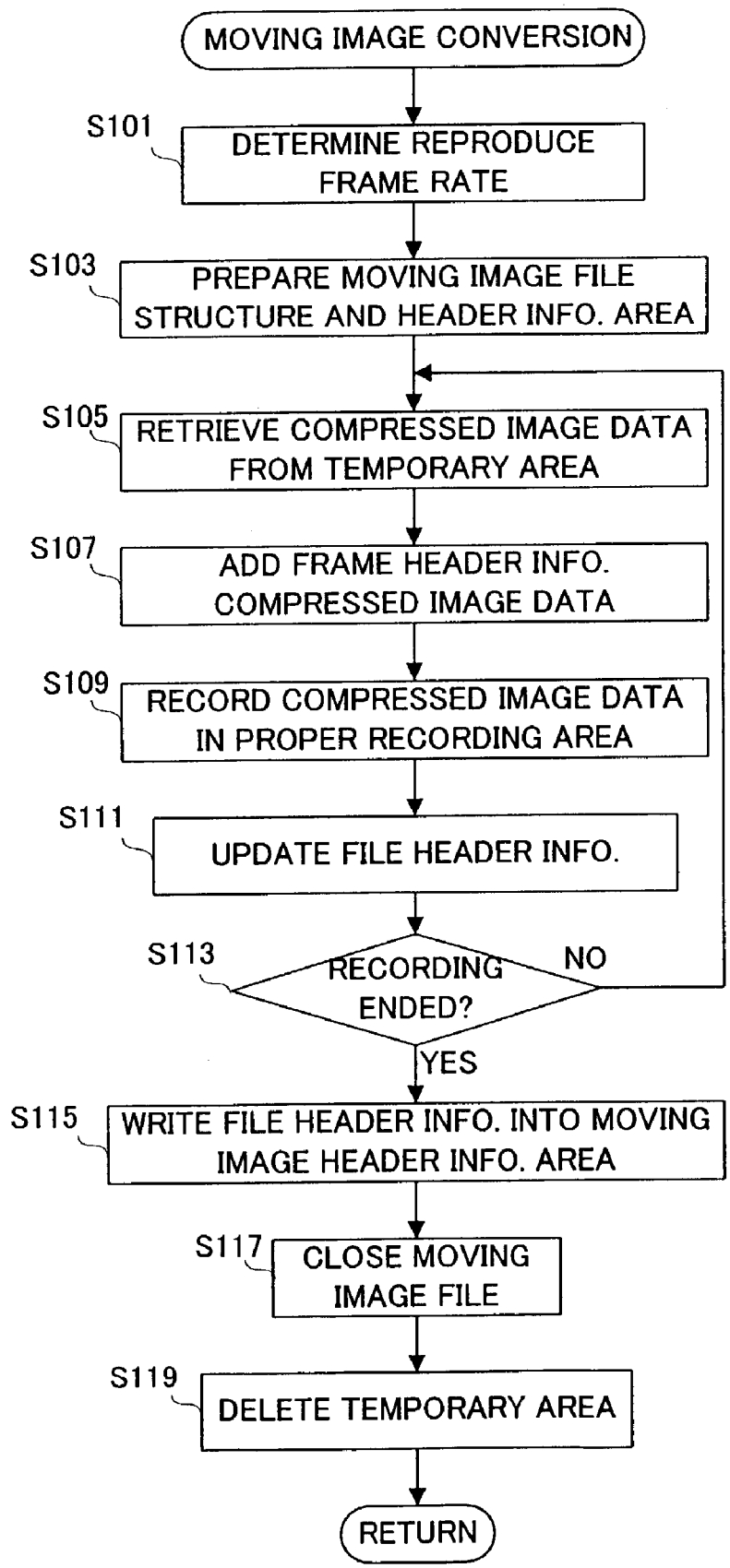
FIG. 7 is a flowchart showing a moving image conversion process.

A moving image conversion process is carried out in accordance with a subroutine shown in FIG. 7. Firstly, the frame rate at a time of the reproduction is determined to be 15 fps in a step S101, and file header information including the determined frame rate information is stored in a memory 32d. The disk controller 40 is instructed to prepare a moving image file structure and a file header information area in a step S103. The moving image file structure and the file header information area are prepared in a proper recording area (frame recording area) of the magnetooptical disk 42 by the disk controller 40. Next, one frame of the compressed image data is taken out from the temporary area in a step S105, and the frame header information is added to a forefront of the compressed image data in a step S107. That is, the disk controller 40 is instructed to reproduce one frame of the compressed image data, and the reproduced compressed image data is stored into the compressed data storing area 26b of the SDRAM 26 through the memory control circuit 24. Next, the process prepares the frame header information by itself, and writes it into the compressed image data 26b through the same memory control circuit 24, allowing the frame header information to be added to a forefront of the compressed image data.

The compressed image data to which the frame header information is added is moved to the proper recording area of the magnetooptical disk 42 in a step S109. That is, the frame header information and the compressed image data are read out from the compressed data storing area 26b through the memory control circuit 24, and along with the recording instruction, the read frame header information and the compressed image data are applied to the disk controller 40. This allows the compressed image data having the frame header information added to a forefront thereof to be recorded in the proper recording area. Upon completion of the step S109, the file header information stored in the memory 32d is updated. More specifically, the total reproducing time, the total number of the frames, and the forefront address of each frame that follow the compressed image data accumulated in the proper recording area as of this time and the frame rate information of 15 fps are updated in a step S111.

It is determined whether or not all of the compressed image data within the temporary area are moved to the proper recording area in a step S113, and if NO is determined, the process returns to the step S105 so as to repeat the aforementioned process. On the other hand, if YES is determined, the process proceeds to a step S115 so as to apply not only the file header information stored in the memory 32d but also the recording instruction to the disk controller 40. The file header information is written into the file header information area by the disk controller 40, thereby obtaining a moving image file structured as shown in FIG. 9. The file name of the moving image file, the total number of frames of the compressed image data within the moving image file, the forefront address of each frame, the frame rate of the moving image (15fps), and so on are included in the file header information as described above. Upon completion of preparing the moving image file, the moving image file is closed in a step S117 (that is, not considering it as a subject to be operated), and the temporary area is deleted in a step S119. The process returns to a routine on a higher hierarchy later.

Figure 5:
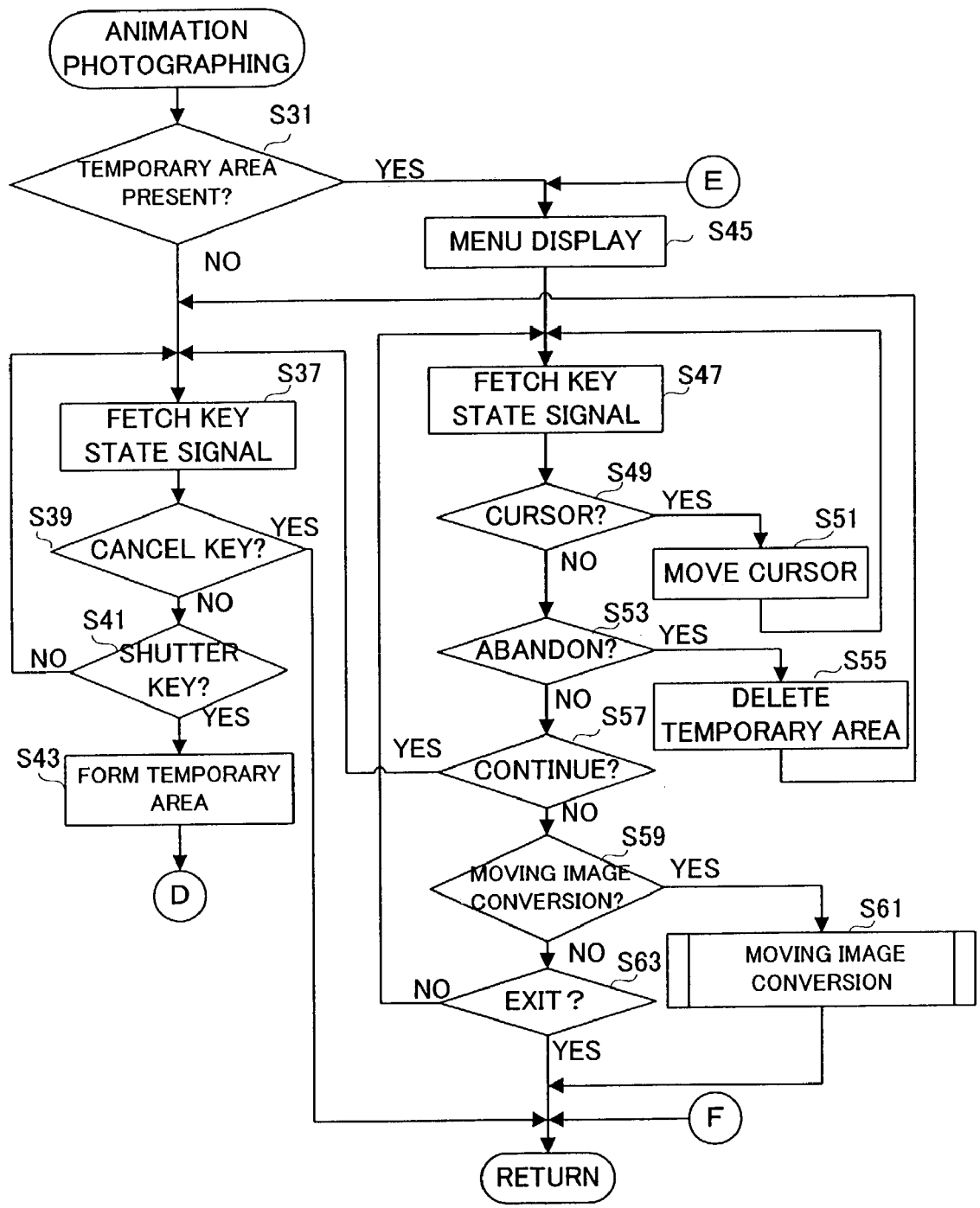
FIG. 5 is a flowchart showing one portion of an animation photographing process.
Figure 6:
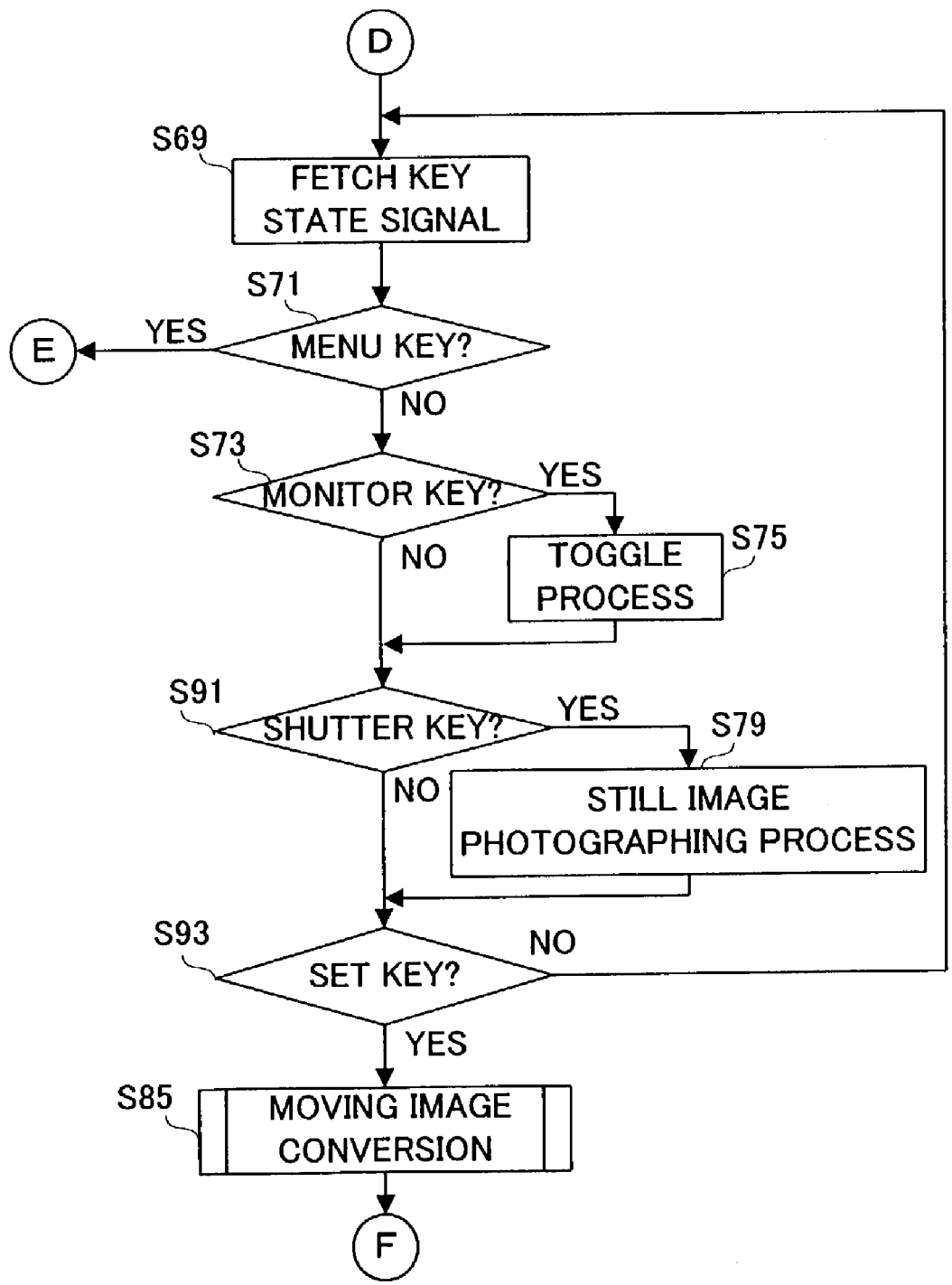
FIG. 6 is a flowchart showing another portion of the animation photographing process.

Although the animation photographing process is carried out in accordance with a flowchart shown in FIG. 5 and FIG. 6, this process is approximately same as the interval photographing process, and therefore, duplicated descriptions are herein omitted by adding the same step numbers to the same process steps.

In the animation photographing process, the still image photographing process of the arbitrary number of frames is carried out in response to an operation of the shutter key 64 by the operator. Thus, the setting of the initial value of the photographing time interval and the moving image continuous time (step S33), and the calculation of the number of recording frames (step S35) are not carried out. In addition, since the photographing time interval is not set, and the number of recording frames is not calculated, processes related to the timer 32b (step S65, step S67), and processes related to the number of recording frames (step S81, step S83) are not carried out, either.

In place thereof, the still image photographing process is carried out in the step S79 when it is determined that the shutter key 64 is operated in a step S91. Furthermore, when it is determined that the set key 68 is operated in a step S93, the moving image conversion process is carried out in the step S85, assuming that the recording is ended.

Figure 11:
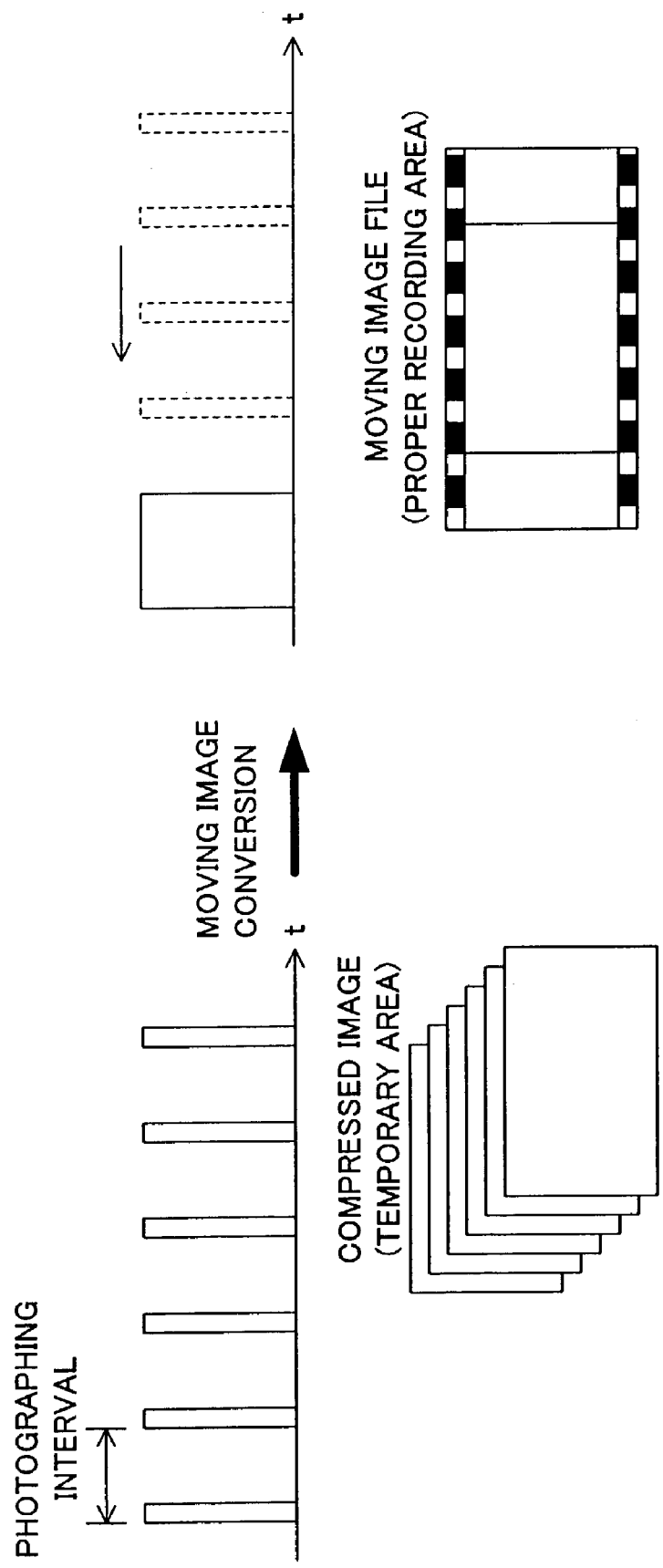
FIG. 11 is an illustrative view showing one portion of an operation of the interval photographing process.
Figure 12:
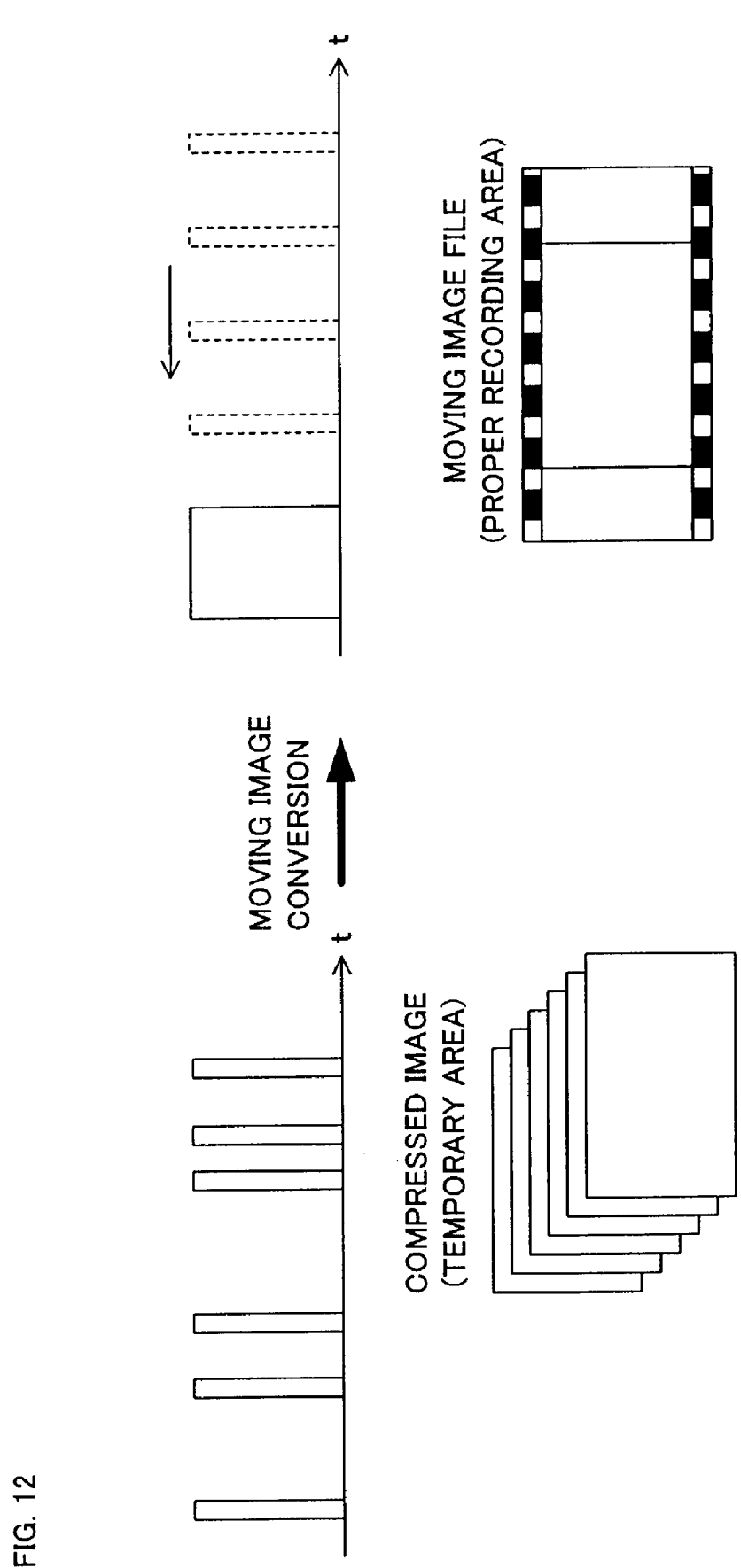
FIG. 12 is an illustrative view showing one portion of an operation of the animation photographing process.

Referring to FIG. 11, in the interval photographing process, the still image photographing process is carried out at predetermined time intervals (period), and the compressed image data obtained by each photographing is stored in the temporary area. Upon completion of the photographings of the predetermined number of frames, the compressed image data stored in the temporary area is converted into the moving image file, and the converted moving image file is stored in the proper recording area. On the other hand, referring to FIG. 12, in the animation photographing process, the still image photographing process is carried out at arbitrary time intervals (period), and each compressed image data obtained by photographing is stored in the temporary area as in the interval photographing process. If the operator applies an instruction to end the recording, the moving image conversion process is subjected to the compressed image data within the temporary area, and the converted moving image file is stored in the proper recording area.

Figure 8:
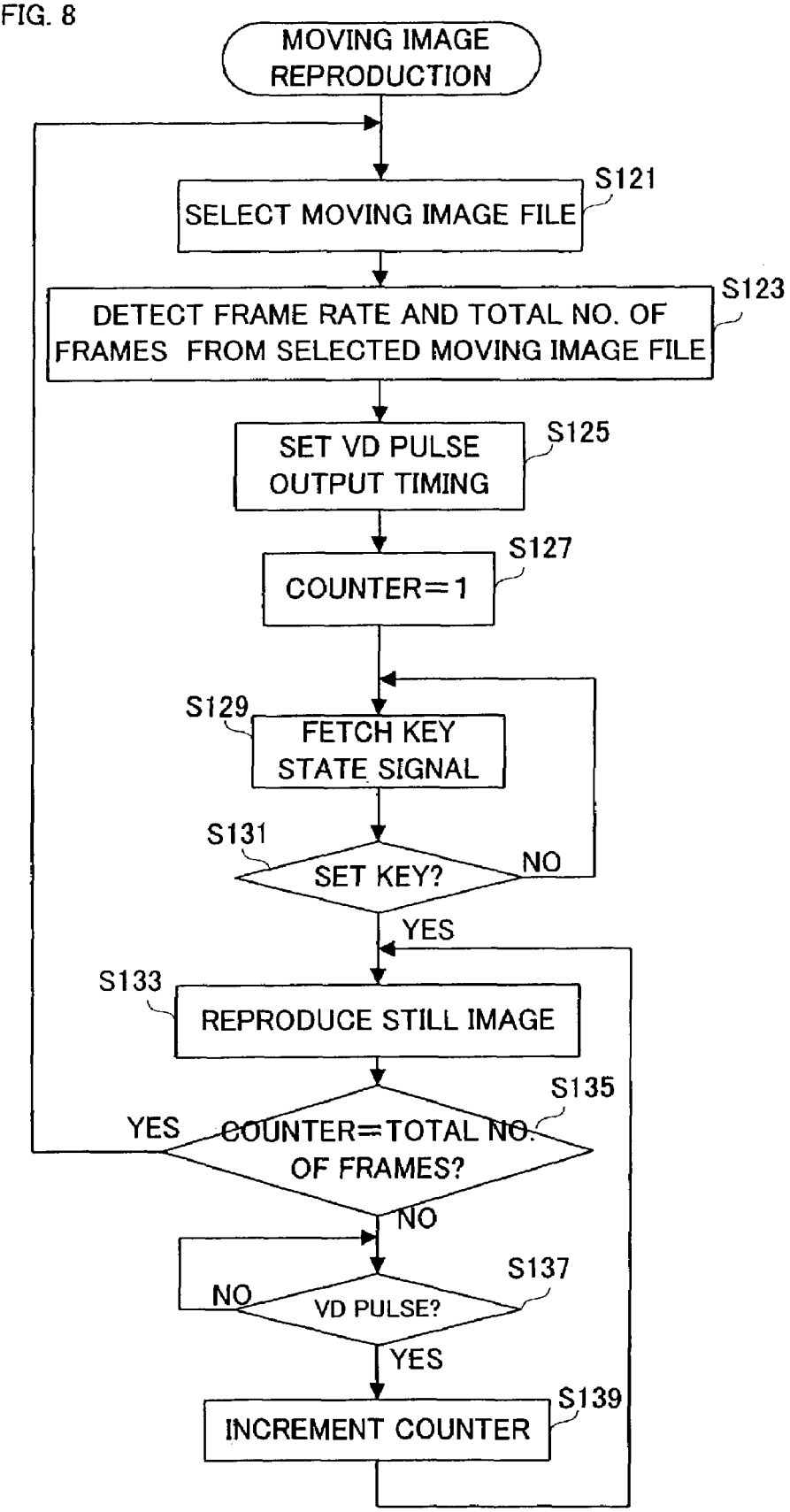
FIG. 8 is a flowchart showing a reproducing process.

When the reproduction mode is selected, the CPU 32 processes a flowchart shown in FIG. 8. Firstly, a desired moving image file is selected in a step S121, and the frame rate and the total number of frames of the desired moving image file are specified in a succeeding step S123. In the step S123, the disk controller 40 is instructed to reproduce the file header information included in the desired moving image file so as to detect the frame rate and the total number of frames from the reproduced file header information. When the frame rate and the total number of frames are specified, a timing of outputting a VD pulse which corresponds to the frame rate is set to the TG 16 in a step S125, and "1", is set to the counter 32a in a step S127.

Consequently, the key state signal is fetched from the system controller 44 in a step S129, and it is determined from the key state signal whether there is presence or absence of the set key 68 in a step S131. If NO is determined, the process returns to the step S129, and if YES is determined, the process proceeds to a step S133 so as to reproduce an image of the frame which corresponds to the current count value.

The disk controller 40 is instructed to reproduce the compressed image data having the same frame number as the current count value and the corresponding frame header information so as to write the compressed image data into the compressed data storing area 26b of the SDRAM 26 through the memory control circuit 24 and fetch the frame header information in a step S133. Upon completion of writing the compressed image data, the JPEG CODEC 36 is applied a decompression instruction after confirming a compression format is JPEG on the basis of the header information. The compressed image data stored, in the compressed data storing area 26b is decompressed by the JPEG CODEC 36, and the decompressed image data is applied to the video encoder 28 via the image data storing area 26a. The video encoder 28 converts the decompressed image data into a composite image signal, and an image corresponding to the converted composite image signal is displayed on the monitor 30.

Upon completion of the step S133, the process proceeds to a step S135 so as to compare the value in the counter 32a with the total number of frames detected in the step S123. Herein, if count value<the total number of frames is true, an input determination of the VD pulse is carried out in a step S137, and if a determination result showing that there is the input is obtained, the process returns to the step S133 after incrementing the counter 32a in a step S139. On the other hand, if the count value reaches the total number of frames, the process returns to the step S121.

Accordingly, each compressed image data is reproduced in accordance with the frame rate detected by the management information of the moving image file. Therefore, the moving image that moves at a desired speed is displayed on the monitor 30.

According to this embodiment, the object is photographed for a plurality of times in both processes, e.g. the interval photographing and the animation photographing, and the compressed image data is generated each photographing by each photographing. The generated compressed image data is temporarily stored in the temporary area within the magnetooptical disk. Herein, in the interval photographing process, the still image photographing is carried out at predetermined time intervals, and in the animation photographing process, the still image photographing is carried out in response to the operation of the shutter key. Upon completion of the still image photographing of the desired number of frames, the moving image file including the respective generated compressed image data and the predetermined frame rate information is formed in the proper recording area within the magnetooptical disk. In reproducing the moving image file, the frame rate information is firstly detected, and the compressed image data of each frame is reproduced in accordance with this information. As a result, the moving image that moves at the desired speed is displayed on the monitor.

Therefore, if a movement at a minute speed such as a blossom situation of plants, a movement of clouds, a cell division, and so on is photographed in the interval photographing mode, it is possible to observe the movement of the object at the minute speed by compressing a time axis. In addition, if photographed at an arbitrary timing by setting the animation photographing mode and deforming a clay modeling, a model set or the like, it becomes possible to produce a movie such as a so-called clay animation.

Furthermore, in this embodiment, the photographing conditions such as the focus, the exposing time, the white balance adjusting value, and so on are to be locked prior to selecting the interval photographing/the animation photographing, it is possible to prevent a flicker from producing as a result of a photometer value (evaluation value) being deviated in carrying out respective still image photographing processes.

Still furthermore, in this embodiment, since the compressed image data obtained by respective still image photographing processes is to be stored in the temporary area of the magnetooptical disk, the photographed image (compressed image data) is not deleted even if the battery 70 runs out in the middle of the photographing.

Although in this embodiment, the magnetooptical disk is used as a recording medium, a non-volatile semiconductor memory may be used in place of the magnetooptical disk. Furthermore, the moving image in this embodiment may be prepared in a QuickTime format. Still furthermore, although the CCD imager is used as an image sensor in this embodiment, a CMOS imager may be used in place of the CCD imager. Moreover, although the frame rate information set to the moving image file in the interval photographing process or the animation photographing process is always 15 fps in this embodiment, it may be possible to be capable of setting an arbitrary frame rate.

In addition, since an aperture amount is assumed to be fixed, only the exposing time is to be locked or unlocked when the AE lock key is operated in this embodiment. With regard to a digital camera having a variable aperture amount, it is needed to lock or unlock not only the exposing time but also the aperture amount in response to the operation of the AE lock key.

Furthermore, although the monitor is to be turned on/off in response to the operation of the monitor key not only at a time of the interval photographing and the animation photographing but also at a time of outputting the through image in this embodiment, the monitor may be always turned on at a time of outputting the through image if a consideration is given only to restraining an amount of power consumption at a time of the interval photographing and at a time of the animation photographing.

Still furthermore, if the monitor is in the on state at a time of the interval photographing and at a time of the animation photographing, a primary exposing is to be immediately carried out in the still image photographing process even if one of the photographing conditions is in the non-locked state. However, as long as one of the photographing conditions is in the unlocked state, the photographing condition of the non-unlocked state may be re-adjusted with disregard to the condition of the monitor prior to the primary exposing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera, comprising:

an imaging device for carrying out a plurality of photographing processes in accordance with a photographing condition under an interval photographing mode or an animation photographing mode, the plurality of photographing processes creating a moving image formed from a plurality of still images having adjacent still images and a time interval between adjacent still images;

an acceptor for monitoring and selecting, during the time interval between adjacent still images of the moving image created by the plurality of photographing processes which is carried out under the interval photographing mode or the animation photographing mode, any one of a lock state and an unlock state with respect to each of a plurality of parameters which define the photographing condition for each still image of the moving image created by the plurality of photographing processes;

an adjuster for adjusting only one or more parameters on which a selection of the unlock state is selected by said acceptor out of the plurality of parameters based on output of said imaging device during the time interval between adjacent still images of the moving image created by the plurality of photographing processes under the interval photographing mode or the animation-photographing mode; and a creator for creating a file of the moving image formed from the plurality of still images created by the plurality of photographing processes which is carried out under the interval photographing mode or the animation photographing mode.

2. A digital camera according to claim 1, further comprising:

a storage that stores the plurality of still images created by the plurality of photographing processes into a non-volatile memory area; and a creator that creates the moving image file based on the plurality of still images stored in said memory area.

3. A digital camera according to claim 1, wherein said creator creates the moving image file within a recording medium, and said memory area is formed within said recording medium.

4. A digital camera according to claim 1, further comprising:

an assigner for assigning period information to the moving image file; and a reproducer for reproducing the plurality of still images from the moving image file in a period indicated by the period information.

5. A digital camera according to claim 1, wherein the plurality of parameters includes an exposure amount and a focus.

6. A digital camera according to claim 1, wherein the plurality of parameters includes a white balance.

7. A digital camera according to claim 1, wherein the time interval between adjacent still images under each of the interval photographing mode and the animation photographing mode is longer than a time interval under a moving image photographing mode.

* * * * *